United States Patent
Junker

(10) Patent No.: US 12,202,132 B2
(45) Date of Patent: Jan. 21, 2025

(54) PIVOT DRIVE

(71) Applicant: THK CO., LTD., Tokyo (JP)

(72) Inventor: Maximilian Junker, Ratingen (DE)

(73) Assignee: THK CO., LTD., Tokyo (JP)

( * ) Notice: Subject to any disclaimer, the term of this patent is extended or adjusted under 35 U.S.C. 154(b) by 89 days.

(21) Appl. No.: 18/017,192

(22) PCT Filed: Jul. 21, 2021

(86) PCT No.: PCT/EP2021/070316
§ 371 (c)(1),
(2) Date: Jan. 20, 2023

(87) PCT Pub. No.: WO2022/023131
PCT Pub. Date: Feb. 3, 2022

(65) Prior Publication Data
US 2023/0256626 A1 Aug. 17, 2023

(30) Foreign Application Priority Data

Jul. 29, 2020 (DE) .......................... 102020120025.0

(51) Int. Cl.
*B25J 17/00* (2006.01)
*B25J 17/02* (2006.01)
(52) U.S. Cl.
CPC .................................. *B25J 17/0283* (2013.01)
(58) Field of Classification Search
CPC ............................ B25J 17/0283; F16C 19/362
See application file for complete search history.

(56) References Cited

U.S. PATENT DOCUMENTS

| 4,399,718 A | 8/1983 | Zimmer |
| 9,579,770 B2 * | 2/2017 | Pierednik ................ B24B 41/04 |
| 2003/0220058 A1 | 11/2003 | Pollak et al. |
| 2015/0239092 A1 | 8/2015 | Pierednik et al. |
| 2016/0237993 A1 | 8/2016 | Bosch et al. |

FOREIGN PATENT DOCUMENTS

| AT | 510 494 A1 | 4/2012 | |
| CN | 110171015 A * | 8/2019 | .......... B25J 17/0275 |
| DE | 10 2004 014 850 A1 | 11/2005 | |
| GB | 2143498 A * | 2/1985 | .......... B25J 17/0266 |
| GB | 2 566 994 A | 4/2019 | |
| JP | 2000-218675 A | 8/2000 | |

(Continued)

OTHER PUBLICATIONS

International Search Report dated Nov. 8, 2021 issued in PCT/EP2021/070316.

(Continued)

*Primary Examiner* — Randell J Krug
(74) *Attorney, Agent, or Firm* — WHDA, LLP

(57) ABSTRACT

A pivot drive (1) having a base (10), an output element (12) which is mounted to the base (10) in a manner so as to be rotatable around an axis of rotation and pivotable around two or more pivot axes, the two or more pivot axes intersecting each other at a point of intersection which is arranged on the axis of rotation, and having a rotation actuator (30) and two or more pivot actuators (42, 44), the rotation actuator (30) and the pivot actuators (42, 44) being mounted in a stationary manner with respect to the base (10).

14 Claims, 10 Drawing Sheets

(56) References Cited

FOREIGN PATENT DOCUMENTS

| JP | 2020-89932 | A |   | 6/2020 |
|----|------------|---|---|--------|
| JP | 2020089932 | A | * | 6/2020 |
| WO | 2012/098347 | A1 |   | 7/2012 |
| WO | 2016/198867 | A1 |   | 12/2016 |

OTHER PUBLICATIONS

Office Action dated Dec. 4, 2023, issued in counterpart JP application No. 2023-504837, with English translation. (8 pages).

* cited by examiner

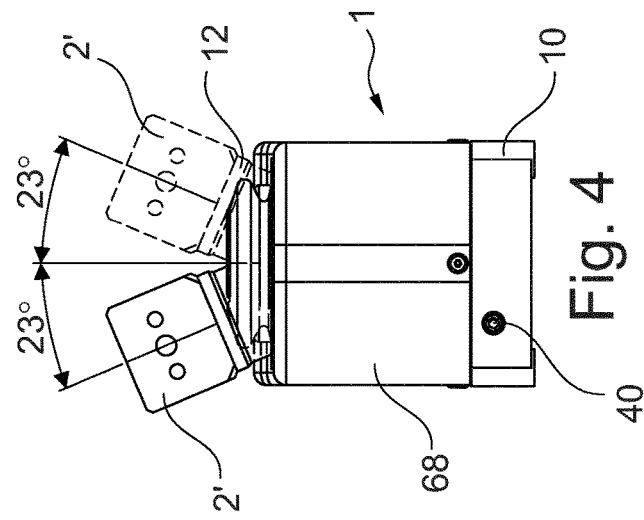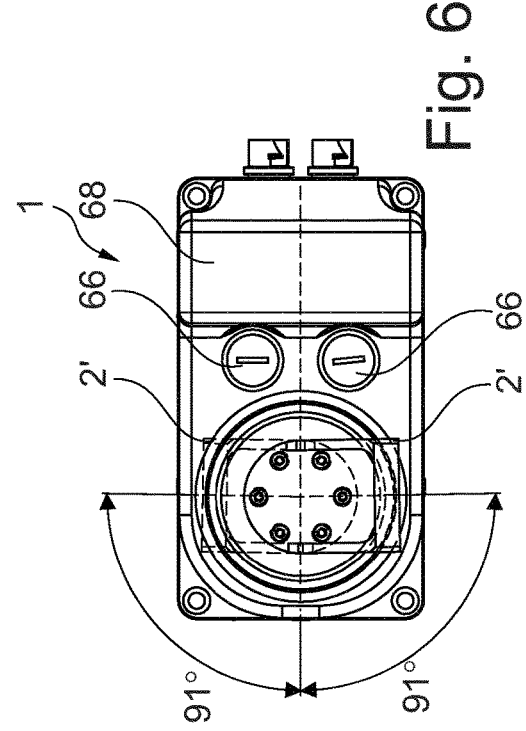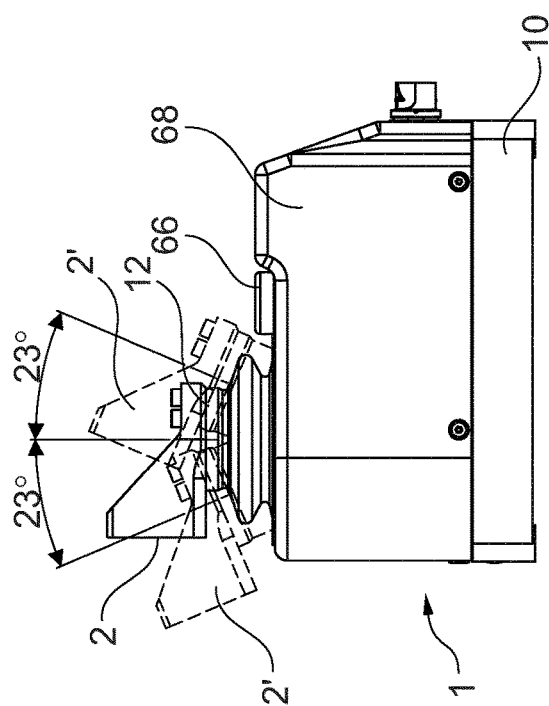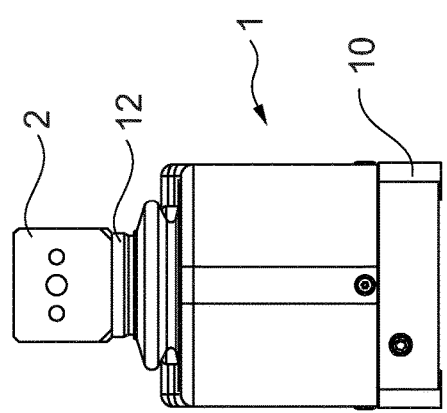

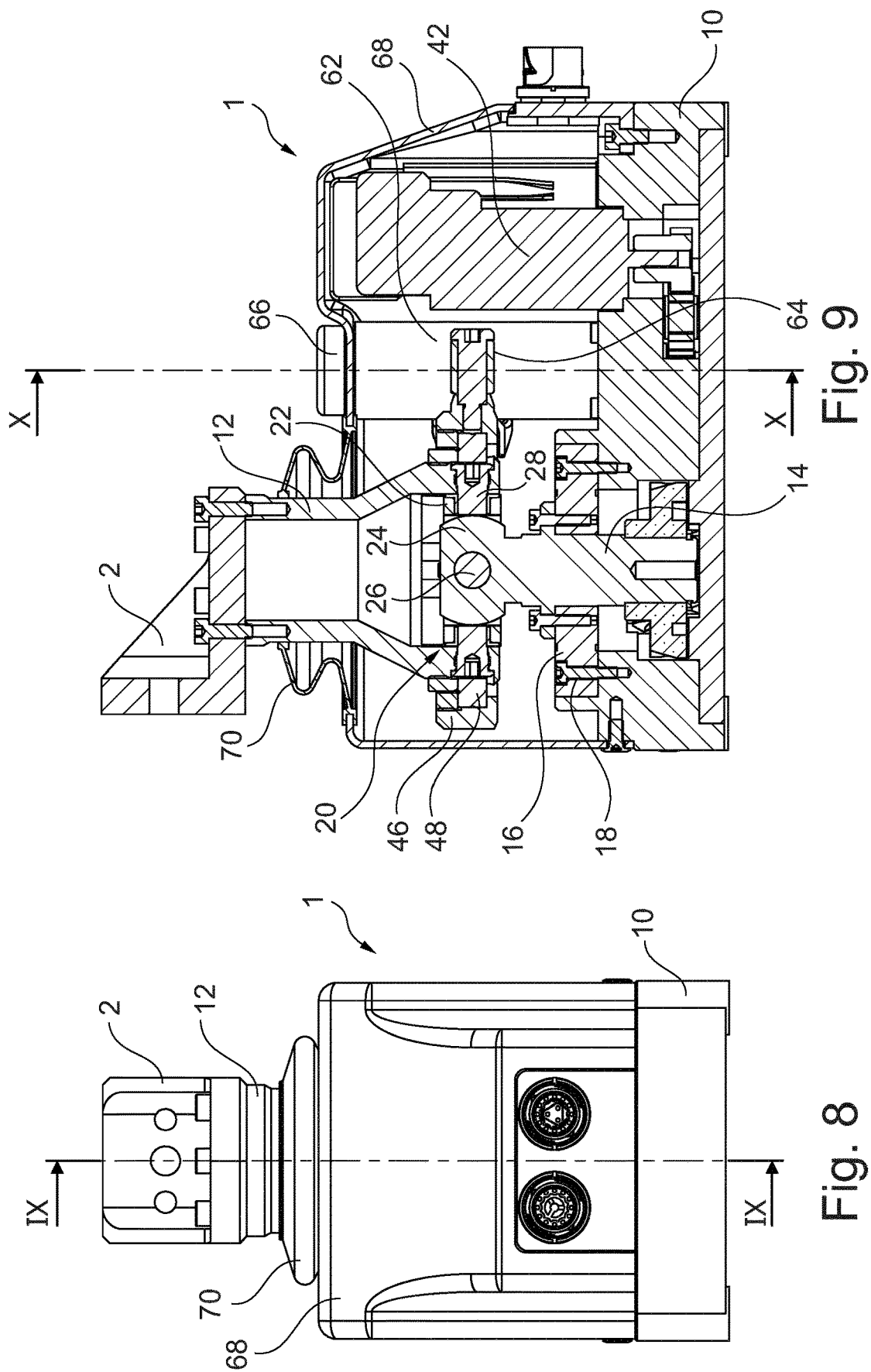

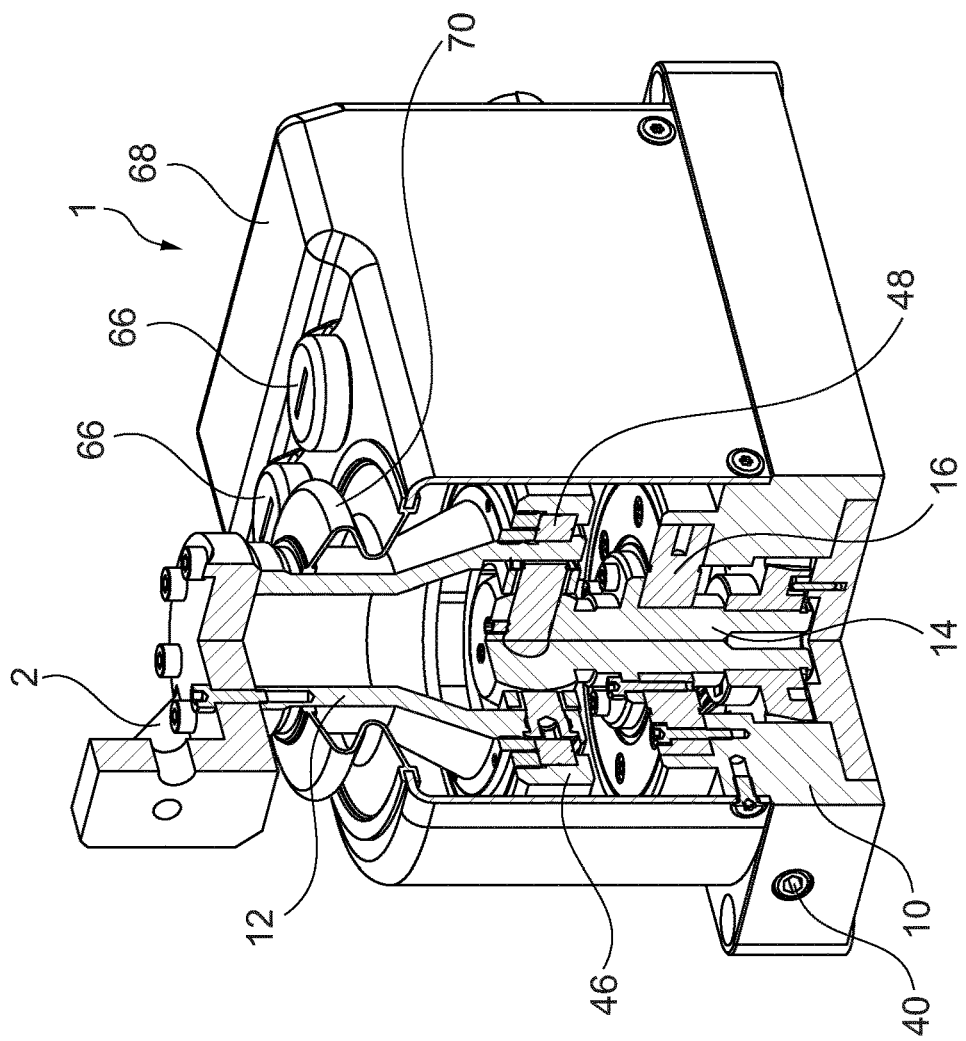
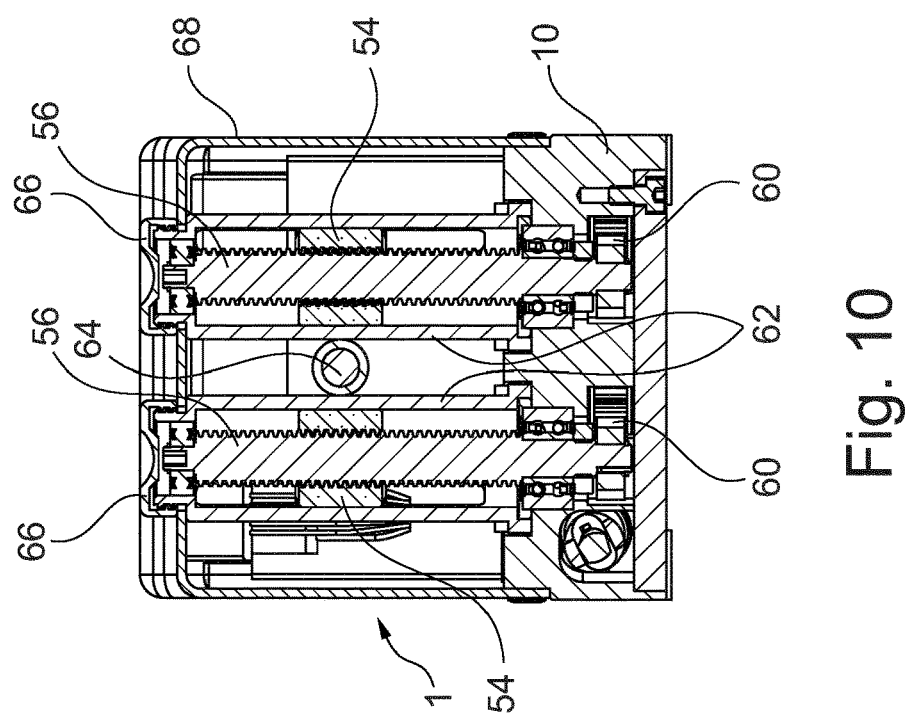
Fig. 11
Fig. 10

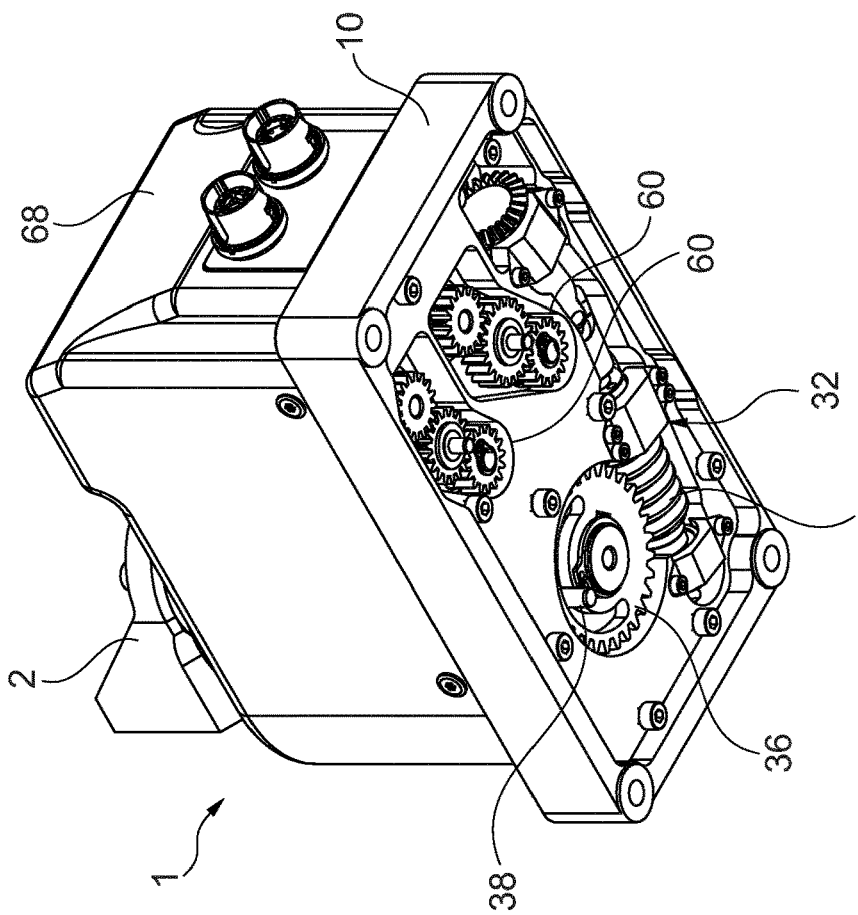
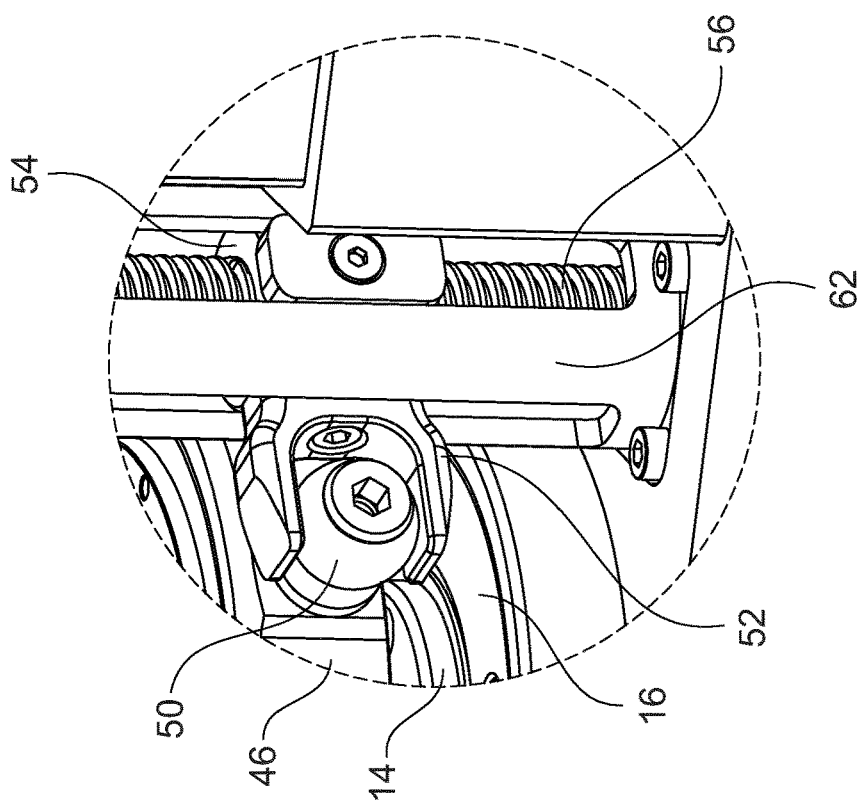

PIVOT DRIVE

The invention relates to a pivot drive.

A pivot drive is an electromechanical device which allows a controlled movement of an output element with respect to a reference element, e.g. a base. Preferably, the output element can be moved around all three axis of a Cartesian coordinate system.

Pivot drives can be used for many applications. One example is a gripper which is attached to the output element and which can be displaced with respect to the base of the pivot drive. The base of the pivot drive in turn can be connected to an arm of a robot.

One example of a prior art pivot drive is known from U.S. Pat. No. 4,399,718. This known pivot drive is disadvantageous in that a displacement around one axis results in a translational displacement of another axis around which a displacement of the output element is possible. This complicates a displacement of the output element with respect to the base.

The object of the invention is to provide a pivot drive in which a controlled movement of the output element with respect to the base is possible.

In order to achieve this object, the invention provides a pivot drive having a base, an output element which is mounted to the base in a manner so as to be rotatable around an axis of rotation and pivotable around two or more axes, the pivot axes intersecting each other at a point of intersection which is arranged on the axis of rotation, and having a rotation actuator and two or more pivot actuators, the rotation actuator and the pivot actuators being mounted in a stationary manner with respect to the base. Arranging the pivot axes such that they intersect each other at a point of intersection which is arranged on the axis of rotation ensures that a displacement around one axis does not result in the other axis as such being in displaced in a translational manner. Ensuring that all axis intersect in a single point significantly simplifies the control of the displacement of the output element. Further, arranging all actuators in a stationary manner with respect to the base ensures that none of the motors used in the actuators is displaced, during a displacement of the output element, with respect to the base such that there is no issue with cables or conductors on which a bending load would act if the motors were displaced with respect to the base.

One of the displacements of the output element is a rotation around the axis of rotation, this displacement also being referred to as a yawing displacement. In order to achieve this movement, the output element can be mounted to a drive element in a manner so as to be pivotable with respect thereto but non-rotatably.

The drive element can be mounted rotatably with respect to the base, in particular by means of a cross-roller bearing. The bearing provides for a smooth, low friction and precise movement of the drive element with respect to the base. In case of a cross-roller bearing, the loads acting on the output element can be reliably transmitted to the base.

As an alternative to a cross-roller bearing, a sliding bearing or a simple roller bearing can be used.

The rotation actuator can be connected to the drive element by means of a gear arranged in the drive path between a rotation motor and the drive element. The gear allows to increase the torque provided by the rotation motor, thereby allowing the use of a compact rotation motor.

Depending on the requirements, the gear can be self-locking or non-locking. For a self-locking gear, a worm gear is particularly suitable.

According to an embodiment, the output element is mounted to the drive element by means of a cardan joint or a universal joint. This joint provides for torque transmission between the drive element and the output element while at the same time allowing the pivot movement of the output element with respect to the base.

As an alternative to the cardan joint or the universal joint, a constant velocity joint could be used.

According to an embodiment, a pivot ring is mounted to the output element so as to be rotatable with respect thereto around an axis which coincides with the axis of rotation of the output element. The pivot ring allows engaging at the output element so as to pivot it around the pivot axes in a mechanically very simple manner.

For moving the pivot ring with respect to the base, the pivot actuators engage at the pivot ring, in particular at an angle of 90° with respect to each other. The combined action of the pivot actuators allows displacing the pivot ring and thus of the output element in all directions.

For displacing the pivot ring, each pivot actuator is operatively connected to an engagement element for engaging at the pivot ring, the engagement element being displaceable in a translational manner. This results in a mechanically simple structure of the pivot gear.

According to an embodiment, each pivot actuator is operatively connected to a gear for converting a rotational movement of the pivot motor into a translational movement of the engagement element. The gear allows introducing high actuation forces into the pivot ring while at the same time using a compact motor.

Depending from the requirements, the pivot gear can be a self-locking gear, in particular a spindle drive, or a non-locking gear.

For transferring the action of the pivot gears to the pivot ring, the engagement element of the pivot gear is one of a claw and a ball-shaped element. This mechanically simple structure allows to reliably transmit the movement of the engagement element to the pivot ring while at the same time allowing for a compensation of the movement of the claw and the ball-shaped element with respect to each other.

The pivot ring is preferably held non-rotatably with respect to the base in order to increase the position precision of the pivot gears.

Preferably, the pivot ring comprises an abutment element which engages between two or more guide surfaces, the guide surfaces being provided by the outer surfaces of the spindle drives. In this manner, a particularly compact construction is achieved which does not require space for a separate guide.

The spindles of the pivot gears can in particular extend perpendicularly to the plane of extend of the base which results in a space saving construction.

The axis of rotation of the motors can be arranged such that they are parallel to the central axis of the spindle drives and thus arranged on top of the base so as to accommodate the motor adjacent to the spindle drives, thus achieving a compact design.

In the alternative, the motors can be accommodated in the base of the pivot drive.

The invention will now be described with reference to two embodiments which are shown in the enclosed drawings. In the drawings, FIG. 1 shows a first perspective view of a pivot drive according to a first embodiment;

FIG. 3 shows a side view of the pivot drive of FIG. 1, with an output element being shown in different positions;

FIG. 4 shows a front view of the pivot drive of the first embodiment, with the output element being shown in different displaced positions;

Figure 2:
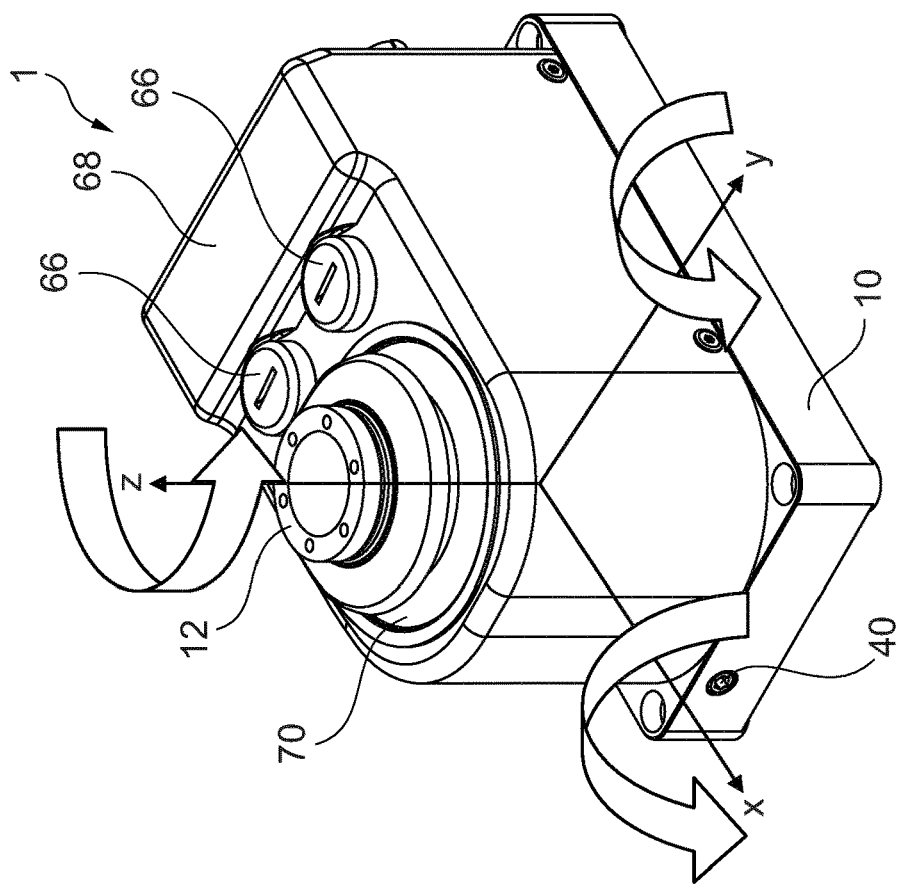
FIG. 2 shows a second perspective view of the pivot drive of FIG. 1.
Figure 1:
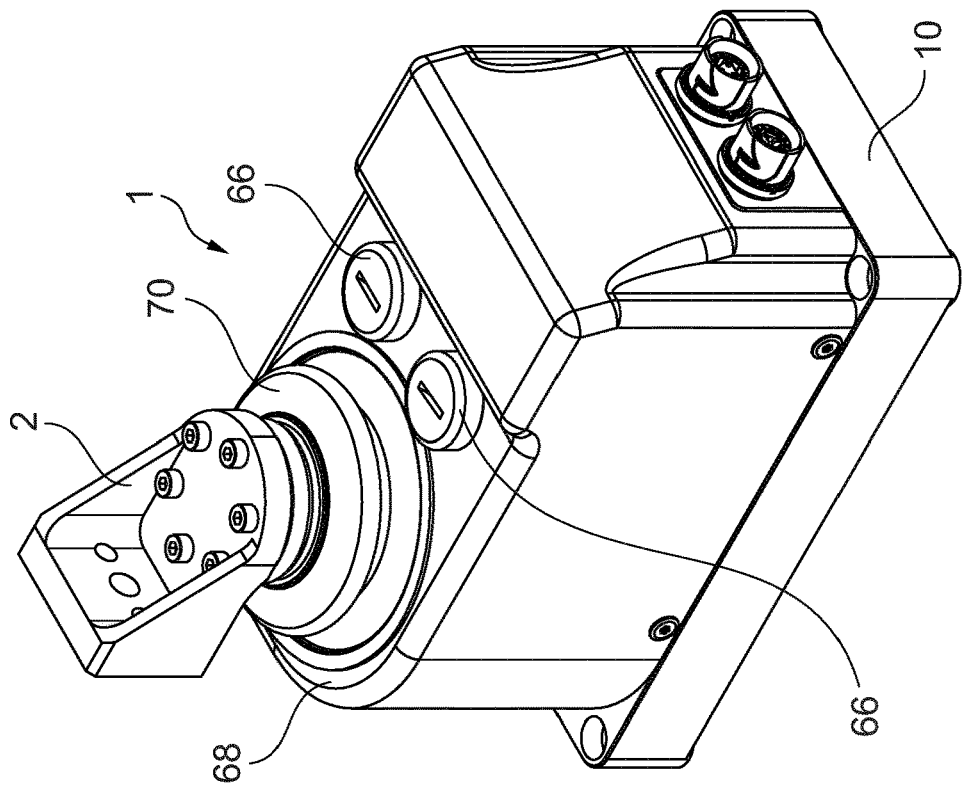
Figure 7:
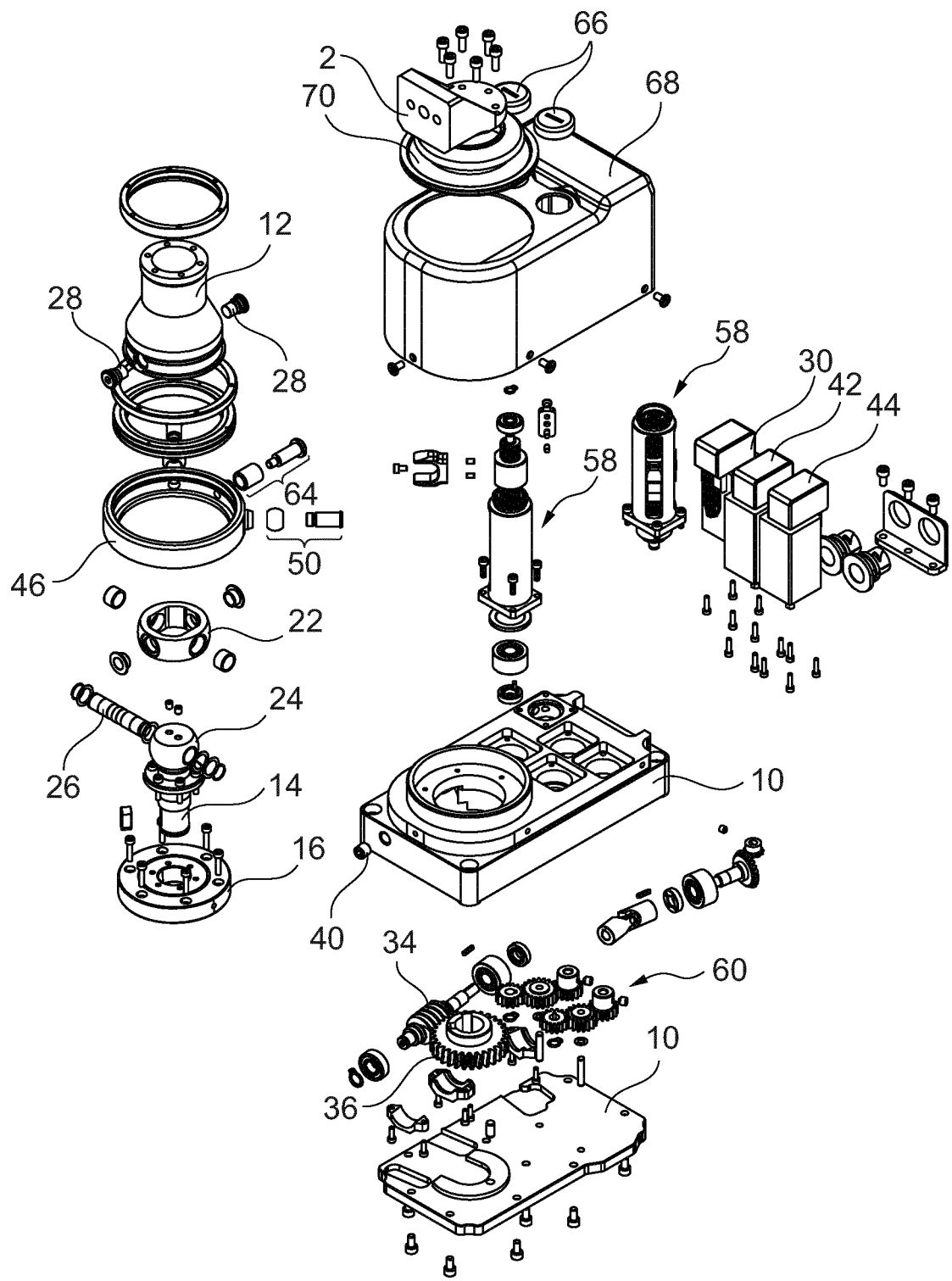
Figure 13:
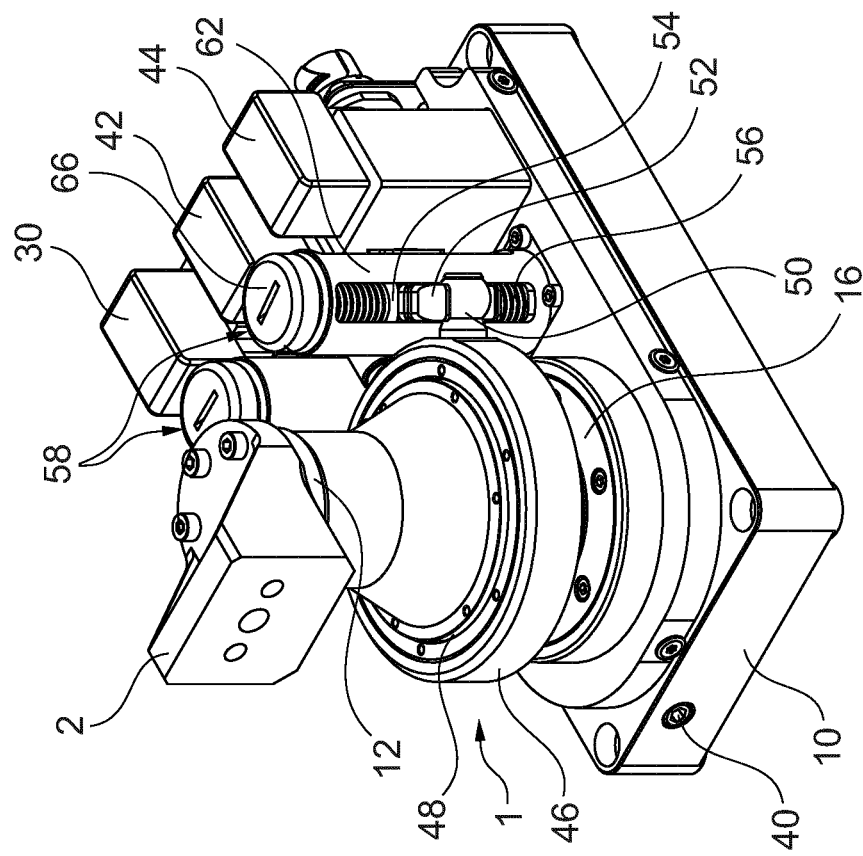
Figure 12:
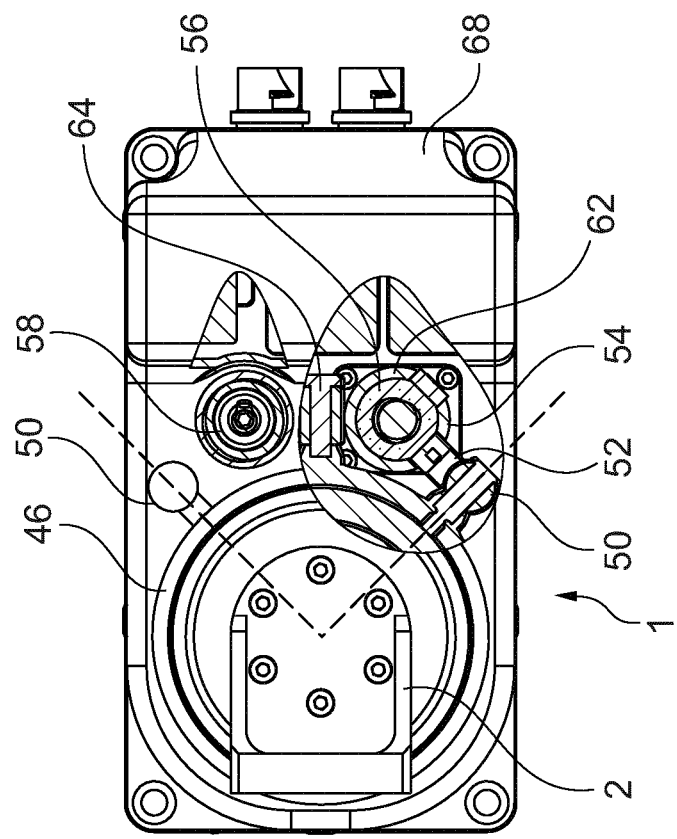
Figure 14:
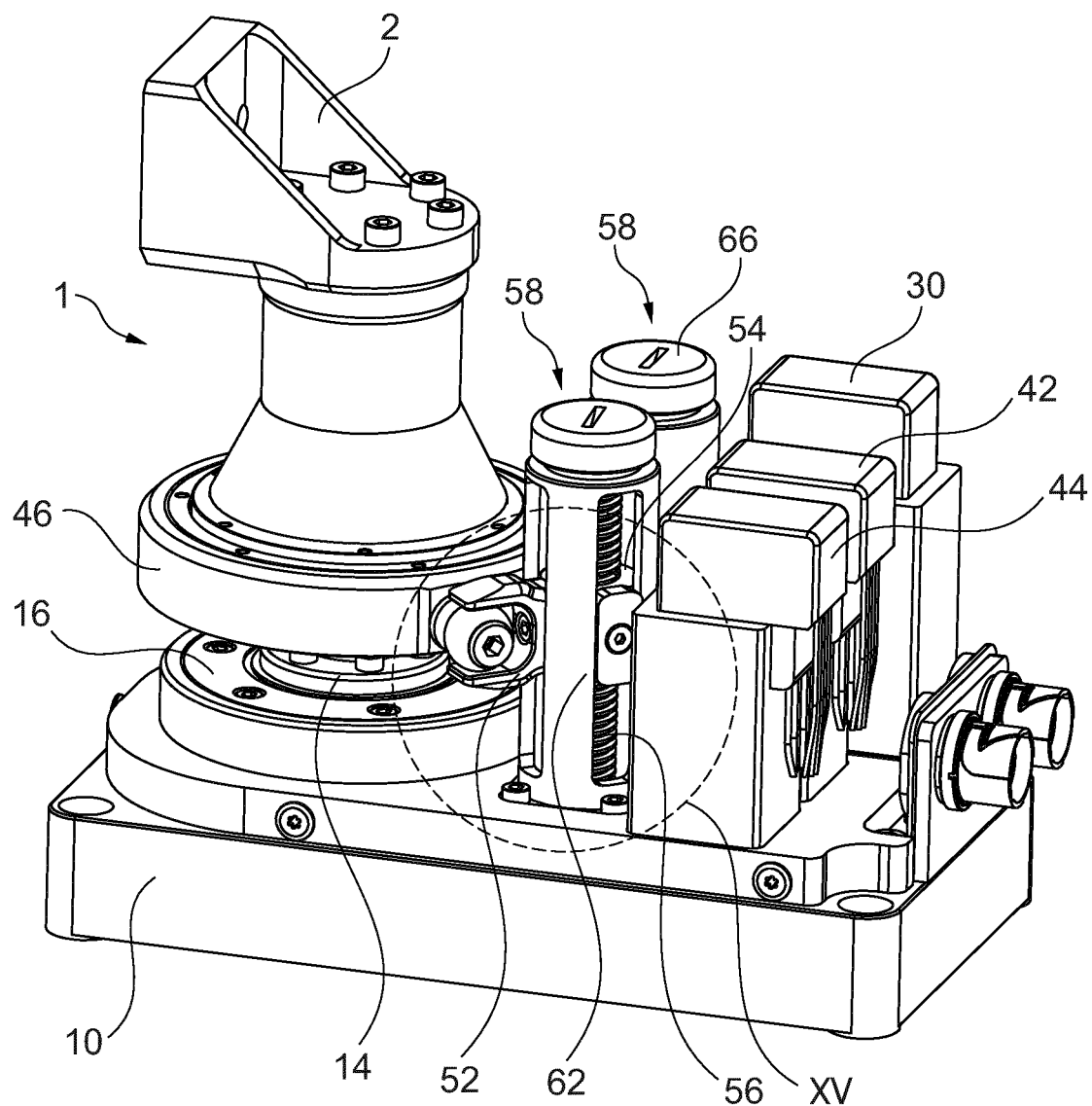
Figure 18:
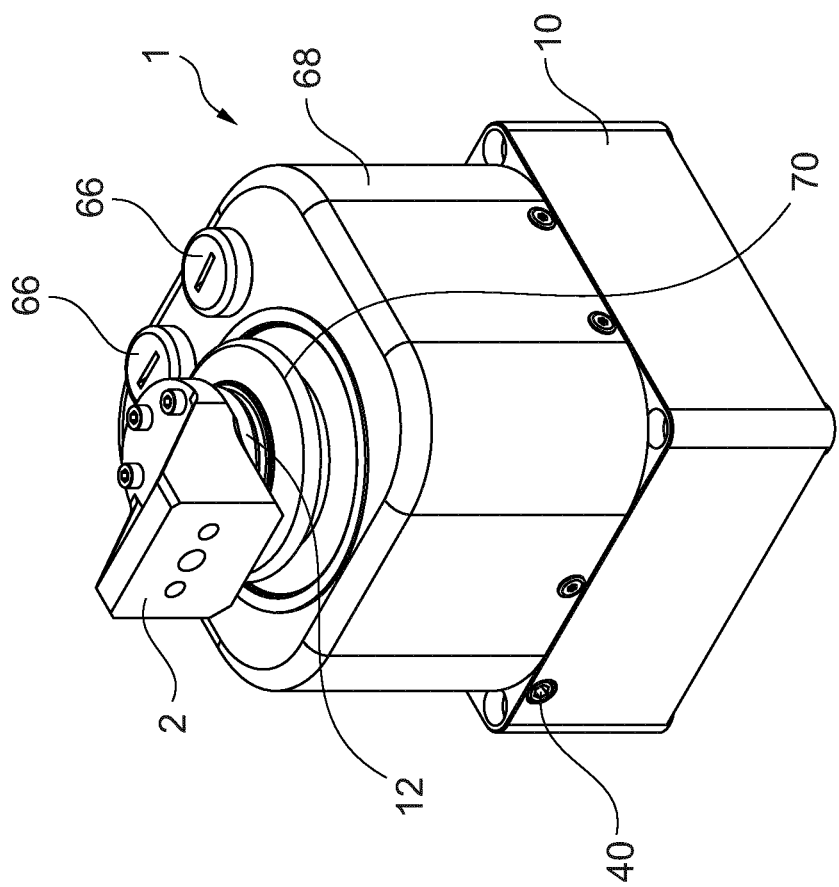
Figure 17:
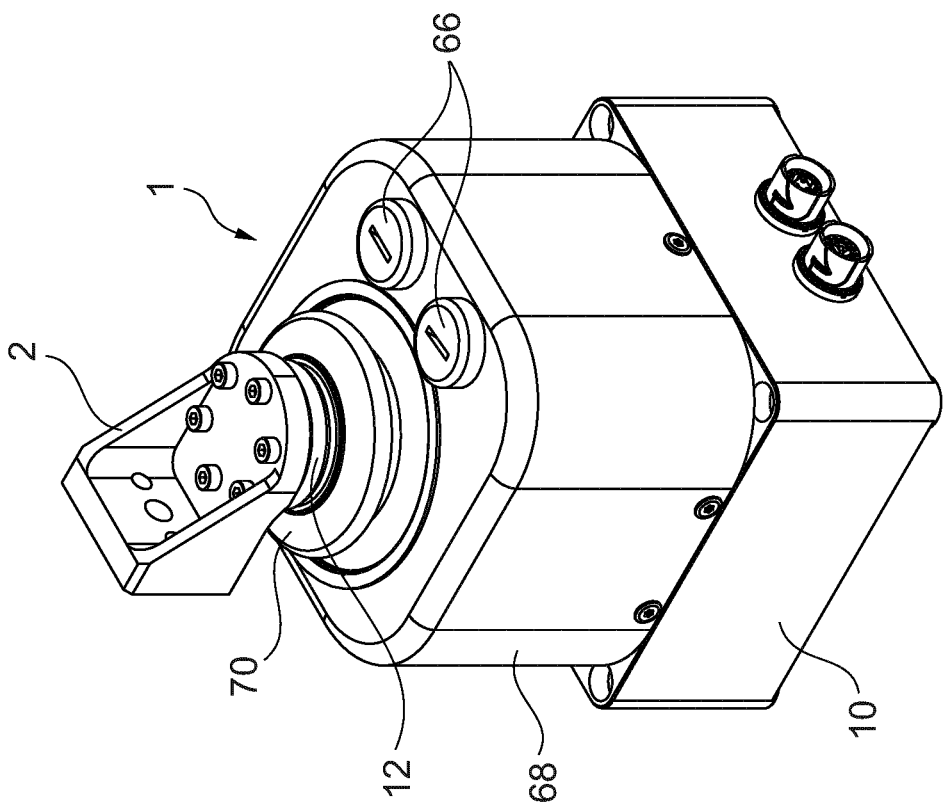
Figure 19:
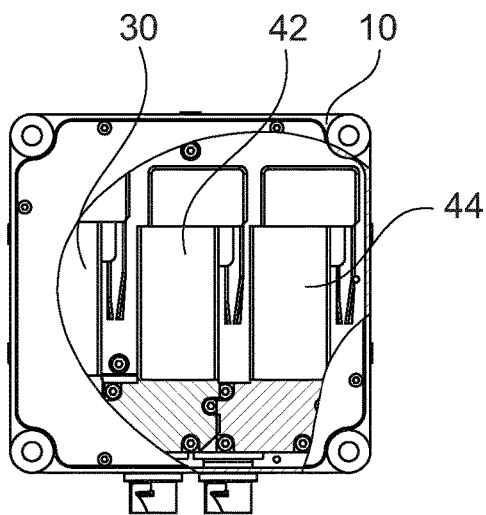
Figure 20:
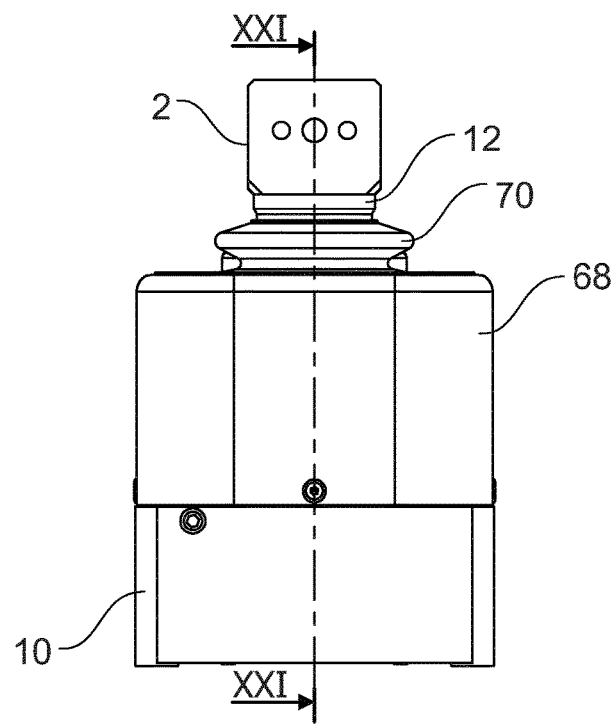
Figure 21:
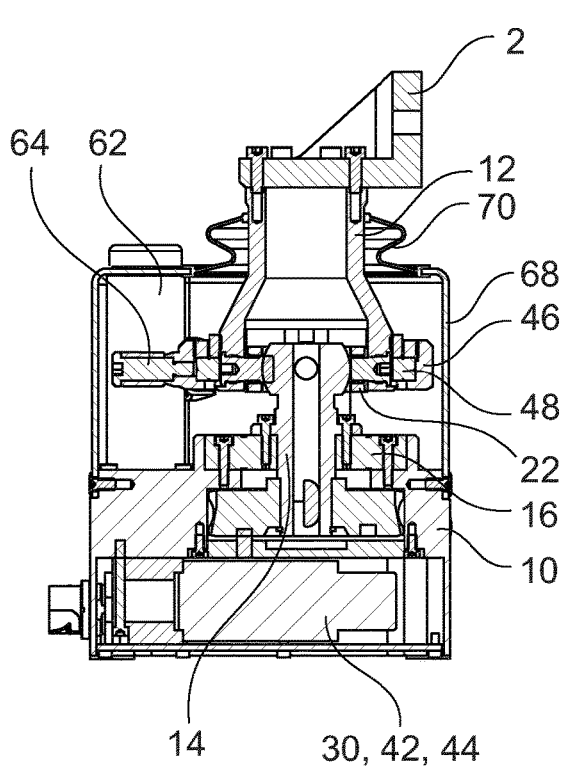

FIG. 5 showing the pivot drive of FIG. 4 with the output element being shown in a central position;

FIG. 6 shows the pivot drive according to the first embodiment in a top view;

FIG. 7 shows the pivot drive according to the first embodiment in an exploded view;

FIG. 8 shows the pivot drive according to the first embodiment in a rear view;

FIG. 9 shows a cross section along lines IX-IX of FIG. 8;

FIG. 10 shows a cross section along the lines X-X of FIG. 9;

FIG. 11 shows in a perspective, partially cut view the pivot drive according to the first embodiment;

FIG. 12 shows in a partially cut top view the pivot drive according to the first embodiment;

FIG. 13 shows in a perspective view the pivot drive according to the first embodiment, with a cover being removed;

FIG. 14 shows the pivot drive of FIG. 13 in a different perspective view;

FIG. 15 shows at an enlarged scale detail XV of FIG. 14;

FIG. 16 shows a perspective bottom view of the pivot drive according to the first embodiment;

FIG. 17 shows a first perspective view of a pivot drive according to a second embodiment of the invention;

FIG. 18 shows a second perspective view of the pivot drive according to the second embodiment;

FIG. 19 shows a partially cut bottom view of the pivot drive according to the second embodiment;

FIG. 20 shows a front view of the pivot drive according to the second embodiment;

FIG. 21 shows a cross section along the lines XXI-XXI of FIG. 20; and

Figure 22:
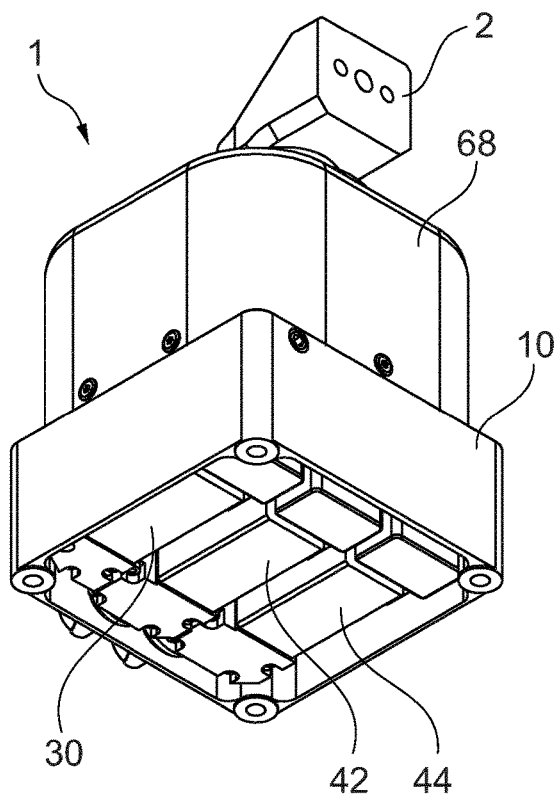

FIG. 22 shows a perspective bottom view of the pivot drive according to the second embodiment.

A first embodiment of a pivot drive 1 is shown in FIGS. 1 to 16.

Generally speaking, pivot drive 1 serves for displacing an output element 12 with respect to a base 10 of pivot drive 1. Displacement of output element 12 is possible around the three axes of a Cartesian coordinate system (please see FIG. 2), namely a rolling movement around an axis X, a pitching movement around an axis Y and a yawing movement around an axis Z. The movement around the axis z is in the following referred to as a rotation while the movement around axis x, y is in the following referred to as pivoting.

Base 10 can be mounted in a stationary manner. As an alternative, base 10 itself is arranged in a moveable manner, e.g. mounted to the end of an arm of a robot.

Output element 12 is intended to receive an element which is to be displaced by pivot drive 1. In the first embodiment, a mounting bracket 2 is shown as connected to output element 12. It can receive for example a mechanically actuated gripper.

Rotation is here possible by a range of ±91° (please see FIG. 6) while a pivoting movement is possible with a range of ±23° (please see FIGS. 3 and 4) for example.

Output element 12 is supported on a drive element 14 which in turn is supported on base 10 so as to be rotatable with respect thereto.

For mounting drive element 14 in a rotatable manner on base 10, a roller bearing 16 (only schematically depicted here) is used. The outer ring of bearing 16 is connected to base 10 (here by means of screws 18; please see in particular FIG. 9) while the inner ring of bearing 16 is connected to drive element 14. Here again, screws can be used.

Roller bearing 16 is preferably a cross-roller bearing.

As alternative to a cross-roller bearing, a simple roller bearing can be used. It is also possible to use a slide bearing.

Irrespective of the particular type of bearing which is used, bearing 16 is adapted for precisely guiding drive element 14 with respect to base 10 while at the same time being able to support the loads which act on output element 12.

Output element 12 is connected to drive element 14 in a manner which allows output element 12 to pivot with respect to drive element 14 while at the same time being connected thereto in a non-rotatable manner.

In the subject embodiment, a cardan joint or universal joint 20 is used for connecting output element 12 to drive element 14.

Cardan joint 20 here comprises a cardan ring 22 which is connected to a drive head 24 of drive element 14 by means of a pin 26 which extends through drive head 24 and is oriented perpendicularly with respect to the axis of rotation of drive element 14.

As an alternative to a single pin 26, two shorter pins arranged on a common axis and protruding from opposite sides of drive head 24 could be used.

A second set of pins 28 with a common axis is arranged at an angle of 90° with respect to the first pin 26, with the second pins 28 connecting cardan ring 22 to output element 12.

As an alternative to cardan joint 20, a constant velocity joint could be used for connecting output element 12 to drive element 14 in a torque-transmitting but pivotable manner.

A rotation actuator is provided for rotating drive element 14 and consequently also output element 12 with respect to base 10.

The rotation actuator comprises an electric motor 30 which preferably is a stepper motor.

As an alternative to a stepper motor, a servo motor or a similar motor can be used.

Rotation actuator 30 is connected to drive element 14 by means of a gear 32 (please see in particular FIG. 16). Gear 32 here comprises a worm gear 34 which is driven by rotation actuator 30, and a gear wheel 36 which engages into worm gear 34 and is connected non-rotatably to drive element 14.

Gear 32 here is formed in a self-locking manner so that no brake or similar device is necessary for preventing rotation of output element 12 under external loads, when rotation actuator 30 is deactivated.

Should no self-locking properties of the gear be desired, different constructions can be used for connecting the rotation actuator 30 to drive element 14.

In FIG. 16, a stop pin 38 is visible which engages into an arc provided in gear wheel 36. Stop pin 38 provides for a mechanical end stop which prevents excessive rotation of drive element 14 with respect to base 10.

It is possible to mechanically rotate worm gear 34 without using rotation actuator 30. To this end, a plug 40 is provided in base 10 which, when removed, provides access to an end face of the shaft on which worm gear 34 is arranged. The shaft can be turned by inserting a screw driver, an Allen key or a similar tool.

For pivoting output element 12 with respect to drive element 14, at least two pivot actuators 42, 44 are provided.

In a manner similar to rotation actuator 30, stepper motors are preferred. As an alternative, servo motors or similar drive devices can be used.

Generally speaking, pivot actuators 42, 44 act on a pivot ring 46 which is connected to output element 12 in a manner so as to be rotatable with respect thereto. Preferably, a roller bearing 48 is used for mounting pivot ring 46 on output element 12. Thus, any pivoting movement introduced into pivot ring 46 is transferred to output element 12.

Pivot ring 46 is provided with two actuation projections 50 which here are arranged at an angle of 90° with respect to each other (please see FIG. 12). In the embodiment shown in the drawings, actuation projections 50 are spherical elements which are bolted to pivot ring 46.

Arranging the actuation projections 50 at an angle of 90° with respect to each other is advantageous in that the resulting lever arms for displacing the pivot ring 46 are at a maximum. It however is possible to use different angle, except for an arrangement where the actuation projections 50 are arranged (almost) diametrically with respect to each other.

At each actuating projection 50, an engagement element 52 engages which here is formed as a claw (please see in particular FIGS. 7 and 14).

The actuating projections 50 are formed with a partially spherical shape which is engaged by at least two flat surfaces arranged opposite each other and in parallel with each other. This structure allows the actuating projections 50 to pivot with respect to the claws while at the same time being displaceable with respect thereto in a translational manner.

Each engagement element 52 is connected to a nut 54 which is arranged on a spindle 56. Each spindle 56 is part of a spindle drive 58 or pivot drive which is used for displacing engagement element 54 in a translational manner.

Each spindle 56 (please see also FIG. 10) is connected to the respective pivot actuator 42, 44 by means of a gear 60 (please see FIG. 16).

Each spindle drive 58 comprises a casing 62 which serves for preventing rotation of nut 54 when spindle 56 is rotated.

Pivot ring 46 is held non-rotatably with respect to base 10, meaning that it cannot be rotated around the axis of rotation/center axis of output element 12. In a simple embodiment, this could be achieved by supporting any torque via spindle drives 58, in particular by means of the engagement between the actuating projections 50 and the claws 52.

In order to achieve a higher precision, pivot ring 46 is here provided with an abutment element 64 which engages between the casings 62 of the spindle drives.

In a manner similar to the rotation drive, each spindle drive 58 is provided with an end cap 66 which allows, when removed, access to the end of the respective spindle so that the spindle can be rotated manually without operating the pivot actuators 42, 44.

A housing 68 is provided which seals all components of pivot drive 1 with respect to the environment. A flexible seal 70 is arranged between an edge of housing 68 and output element 12 so as to prevent contaminations from entering into housing 68.

When both engagement elements 52 are displaced in the same direction, output element 10 performs a pivot movement around axis y. If one of the engagement elements is moved upwardly while the other one is moved downwardly, a pivot movement around axis y is performed. A suitable control of the displacement of the engagement elements 52 allows pivoting output element 12 in every direction.

Further, output element 12 can be rotated by operating rotation actuator 30.

Any pivot movement takes place around axes which intersect each other at a point of intersection which is arranged on the axis of rotation of both output element 12 and drive element 14. In other words, the point of intersection is arranged at the center of the cardan joint which connects drive element 14 to output element 12.

As can be seen in FIG. 10, the spindle drives are arranged such that the axes of rotation of the spindles 56 extend perpendicularly with respect to the plane of extent of base 10. As can be further seen in particular in FIG. 9, the axis of rotation of drive element 14 is also arranged perpendicularly with respect to the plane of extent of base 10.

Actuators 30, 42, 44 are here arranged in parallel with the spindle drives 58. Preferably, the axis of rotation of the motors used in actuators 30, 42, 44 is also arranged perpendicularly with respect to the plane of extend of base 10.

The drive electronics used for controlling actuators 30, 42, 44 is preferably integrated into pivot drive 1. They can in particular be arranged underneath housing 68 adjacent to actuators 30, 42, 44.

A second embodiment of pivot drive 1 is shown in FIGS. 17 to 22. For all elements known from the first embodiment, the same reference numerals are used, and reference is made to the above comments.

The difference between the first and the second embodiment is that in the second embodiment, actuators 30, 42, 44 are not arranged on top of base 10 at the side of spindle drives 58 which is opposite output element 12, but within base 10. To this end, base 10 is increased in height so as to create the space which is necessary for accommodating the actuators 30, 42, 44 (and possibly also their associated drive electronics).

As a consequence from the different position of actuators 30, 42, 44, base 10 now does not have a rectangular shape but a square shape.

The invention claimed is:

1. A pivot drive, comprising:
   a base;
   an output element mounted to the base, the output element being rotatable around an axis of rotation and pivotable around two or more pivot axes, the two or more pivot axes intersecting each other at a point of intersection arranged on the axis of rotation;
   a rotation actuator; and
   two or more pivot actuators, the rotation actuator and the pivot actuators being mounted in a stationary manner with respect to the base,
   wherein the output element is mounted to a drive element so as to be pivotable and non-rotatable with respect to the drive element, and
   the drive element is mounted rotatably with respect to the base by a cross-roller bearing.

2. The pivot drive of claim 1 wherein the output element is mounted to the drive element by a cardan joint or a universal joint.

3. The pivot drive of claim 1, wherein the rotation actuator is connected to the drive element by a gear arranged in a drive path between a rotation motor and the drive element.

4. The pivot drive of claim 3, wherein the gear includes a worm gear and is self-locking.

5. The pivot drive of claim 3, wherein the gear is a non-locking gear.

6. The pivot drive of claim 1, wherein a pivot ring is mounted to the output element so as to be rotatable with respect thereto around an axis which coincides with the axis of rotation of the output element.

7. The pivot drive of claim 6, wherein the pivot ring is held non-rotatably with respect to the base.

8. The pivot drive of claim 7, wherein the pivot ring comprises an abutment element which engages two or more guide surfaces between the two or more guide surfaces, the two or more guide surfaces are provided by outer surfaces of casings for spindle drives operatively connected to the two or more pivot actuators.

9. The pivot drive of claim 6, wherein the pivot actuators engage at the pivot ring, at an angle of 90° with respect to each other.

10. The pivot drive of claim 9, wherein each pivot actuator is operatively connected to an engagement element for engaging at the pivot ring, the engagement element being displaceable in a translational manner.

11. The pivot drive of claim 10, wherein the engagement element is one of a claw and a ball-shaped element.

12. The pivot drive of claim 10, wherein each pivot actuator is operatively connected to a gear for converting a rotational movement of a pivot motor into a translational movement of the engagement element.

13. The pivot drive of claim 12, wherein the gear includes a spindle drive and is self-locking.

14. The pivot drive of claim 12, wherein the gear is a non-locking gear.

\* \* \* \* \*